(12) United States Patent
Plank et al.

(10) Patent No.: US 11,393,115 B2
(45) Date of Patent: Jul. 19, 2022

(54) FILTERING CONTINUOUS-WAVE TIME-OF-FLIGHT MEASUREMENTS, BASED ON CODED MODULATION IMAGES

(71) Applicant: Infineon Technologies AG, Neubiberg (DE)

(72) Inventors: Hannes Plank, Graz (AT); Armin Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 334 days.

(21) Appl. No.: 16/201,598

(22) Filed: Nov. 27, 2018

(65) Prior Publication Data

US 2020/0167942 A1 May 28, 2020

(51) Int. Cl.
*G06K 9/00* (2022.01)
*G06T 7/557* (2017.01)
*G01S 17/36* (2006.01)

(52) U.S. Cl.
CPC .............. *G06T 7/557* (2017.01); *G01S 17/36* (2013.01); *G06T 2207/10028* (2013.01)

(58) Field of Classification Search
CPC .......... B23H 1/028; B23H 7/02; B23H 7/105; G01S 13/36; G01S 15/36; G01S 17/36; G01S 13/587; G01S 13/06; G01S 15/42; G01S 7/4915; G01S 29/07; G01S 15/8915; G01S 15/8977; G01S 15/8979; G01S 7/52028; G01S 7/52046; G01S 17/42; G01S 17/89; G01S 17/931; G01S 7/4817; G01S 17/04; G01S 17/10; G01S 7/003; G01S 7/4802; G01S 7/4811; G01S 7/4813; G01S 7/484; G01S 7/4865; G01S 19/32; G01S 7/4814; G01S 7/4816; H01L 21/67092; H01L 21/67754; H01L 27/14609; B63B 2213/00; G01C 21/16; G06E 3/001; G06K 9/0063; G06K 9/00791; G06K 9/00805; G06K 9/34; G06K 9/38; G06T 5/50; G06T 11/001; G06T 7/246; G06T 2207/10016; G06T 2207/20048; G06T 2207/20156; G06T 2207/30196; G06T 7/11; G06T 7/168; G06T 7/187; G06T 7/194; G06T 2207/10028; H01S 5/0085; H04N 19/117; H04N 19/154; H04N 19/172; H04N 19/186; H04N 19/60; H04N 19/80; H04N 19/85;

(Continued)

(56) References Cited

U.S. PATENT DOCUMENTS 5,889,490 A 3/1999 Wachter et al.
5,974,159 A * 10/1999 Lubin ...................... G06T 5/50
382/106

(Continued)

*Primary Examiner* — Alex Kok S Liew
(74) *Attorney, Agent, or Firm* — Murphy, Bilak & Homiller, PLLC

(57) ABSTRACT

An example method for performing depth measurements with an image sensor comprises, for at least a first pixel, performing one or more continuous-wave phase measurements for the first pixel and performing a coded-modulation measurement for the first pixel. The method further comprises determining a mask value for the first pixel, based on the coded-modulation measurement, and applying the mask value to a distance value calculated from the one or more continuous-wave phase measurements, to obtain a masked distance value for the first pixel that has no ambiguity due to phase wrapping.

20 Claims, 6 Drawing Sheets

(58) Field of Classification Search
CPC .............. H04N 5/3575; H04N 13/239; G01N 21/1717; G01N 29/07; H01J 37/266; H01J 27/14609; G01V 1/30; G03B 13/36; G03B 2205/0046; G03B 2205/0053; G03B 2205/0084; G03B 3/10; G03B 5/00
USPC ...... 348/42, 43, 46; 342/107, 109, 118, 127, 342/129; 382/106
See application file for complete search history.

(56) References Cited

U.S. PATENT DOCUMENTS

| | | | | |
|---|---|---|---|---|
| 6,031,602 | A * | 2/2000 | Parker | G01J 9/0215 356/35.5 |
| 8,027,785 | B2 * | 9/2011 | Adams | B63C 11/02 701/428 |
| 8,908,016 | B2 * | 12/2014 | Gordon | G01B 11/2509 348/49 |
| 9,052,382 | B2 * | 6/2015 | Bamji | G01S 7/491 |
| 9,778,363 | B2 * | 10/2017 | Kadambi | G01S 7/4915 |
| 9,855,894 | B1 * | 1/2018 | Khorasani | G06K 9/00805 |
| 10,260,858 | B2 * | 4/2019 | Martini | G01P 3/36 |
| 10,269,104 | B2 * | 4/2019 | Hannuksela | G06T 5/002 |
| 2004/0056966 | A1 * | 3/2004 | Schechner | H04N 5/23238 348/229.1 |
| 2004/0145792 | A1 * | 7/2004 | Maeyama | G09G 3/34 359/239 |
| 2005/0270609 | A1 * | 12/2005 | Chuang | G11B 7/28 359/22 |
| 2006/0215175 | A1 * | 9/2006 | Yacoubian | G01N 21/9505 356/502 |
| 2009/0180591 | A1 * | 7/2009 | Baumgart | A61B 6/504 378/98.12 |
| 2011/0187819 | A1 * | 8/2011 | Katz | H04N 13/139 348/43 |
| 2011/0293180 | A1 * | 12/2011 | Criminisi | G06T 7/11 382/173 |
| 2014/0055560 | A1 * | 2/2014 | Fu | G06T 7/40 348/42 |
| 2014/0285626 | A1 * | 9/2014 | Fu | H04N 13/271 348/46 |
| 2014/0369623 | A1 * | 12/2014 | Fletcher | G06T 7/42 382/275 |
| 2015/0193938 | A1 * | 7/2015 | Freedman | G01S 17/36 382/154 |
| 2015/0278600 | A1 * | 10/2015 | Kelley | G06T 7/246 382/103 |
| 2016/0005179 | A1 * | 1/2016 | Petyushko | G06T 5/50 382/154 |
| 2016/0086318 | A1 * | 3/2016 | Hannuksela | G01S 17/89 348/43 |
| 2019/0011554 | A1 * | 1/2019 | Greco | G01S 7/52028 |

* cited by examiner

FILTERING CONTINUOUS-WAVE TIME-OF-FLIGHT MEASUREMENTS, BASED ON CODED MODULATION IMAGES

BACKGROUND

The present disclosure is generally related to image processing and is more particularly related to processing image data using a mask generated from a coded-modulation measurement.

BACKGROUND

In optical sensing applications, depth measurements, i.e., measurements of the distance to various features of an object or objects in view of an image sensor may be performed as so-called time-of-flight (ToF) measurements, which are distance measurements determined using the speed of light and image/pixel sensors. The distance to an object of interest is typically calculated per pixel and, once calculated, can be used for depth detection, gesture identification, object detection, and the like. These distances can be combined to create a depth map and/or a three-dimensional (3D) point cloud, e.g., for 3D graphics rendering.

Conventional approaches to TOF measurements require multiple sequential exposures, which may be referred to as subframes, or raw frames, or phase images. For each of these exposures, the light illuminating the object of interest is modulated by a continuous waveform, such as a sinusuoidal or pulsed waveform, with each pixel of the image sensor measuring a correlation of light reflected from the object of interest to a reference signal that is a copy of the modulating waveform. The phase difference between the reference signal and the waveform modulating the light is varied for each exposure. For example, one approach requires four separate exposures, such as 0°, 90°, 180° and 270°. Measurement information from the four exposures is collected and cam be used to determine a depth map.

A well-known problem with continuous-wave (CW) TOF measurements is that the correlation function for the modulating waveform and the corresponding reference signal produces a periodic waveform. This creates an ambiguity in the resulting phase measurements, as the phase measurements themselves do not provide any indication of which cycle of the period correlation waveform they result from. This means that objects in the background of an object or objects of interest can reflect light that shows up as an unwanted response in the image, especially if the background object or objects are highly reflective.

A conventional solution to this problem is to make an additional phase set of measurements, i.e., to perform additional exposures, using a reference signal with a different frequency. Because an appropriately chosen frequency for this second reference signal will result in a different ambiguity distance, the measurements performed with the two different reference signal frequencies can be combined to resolve the ambiguity. Of course, this approach increases the number of measurements that are required, increasing data storage and processing power requirements for the imaging system.

SUMMARY

Time-of-flight (TOF) systems and techniques addressing these needs are disclosed, whereby distance ambiguity is removed by masking continuous-wave time-of-flight measurements using a mask derived from coded-modulation measurements performed using the same pixels. Similar techniques can be applied to mask other image data obtained from an image sensor to, for example, limit the masked image data to data corresponding objects falling within a predetermined range of distances from the image sensor.

An example method for performing depth measurements with an image sensor according to some of the disclosed embodiments comprises, for at least a first pixel, performing one or more continuous-wave phase measurements for the first pixel and performing a coded-modulation measurement for the first pixel. The method further comprises determining a mask value for the first pixel, based on the coded-modulation measurement, and applying the mask value to a distance value calculated from the one or more continuous-wave phase measurements, to obtain a masked distance value for the first pixel that has no ambiguity due to phase wrapping.

Another example method for processing image data according to some embodiments disclosed herein comprises performing a coded-modulation measurement for each of a plurality of pixels of an image sensor and generating a mask by comparing each coded-modulation measurement to a predetermined threshold value. This example method further comprises generating masked image data by applying the mask to image data obtained from the plurality of pixels.

Corresponding image processing systems are also disclosed. One such system includes a sensor comprising a plurality of pixels configured to generate a respective plurality of pixel signal values in response to received light, where each pixel is configured to obtain its respective pixel signal value by demodulating received light using a reference signal. This system further includes a reference signal generator configured to generate a reference signal and to provide the reference signal to the plurality of pixels, and a control circuitry configured to control the reference signal generator and the plurality of pixels to perform one or more continuous-wave phase measurements for each pixel and to control the reference signal generator and the plurality of pixels to perform a coded-modulation measurement for each pixel. The control circuit is further configured to determine a mask value for each pixel, based on the respective coded-modulation measurement, and to apply the mask value for each pixel to a respective distance value calculated from the one or more continuous-wave phase measurements for the pixel, to obtain a masked distance value for each pixel.

Another example image processing system also comprises a sensor comprising a plurality of pixels configured to generate a respective plurality of pixel signal values in response to received light, where each pixel is configured to obtain its respective pixel signal value by demodulating received light using a reference signal. This system further includes a reference signal generator configured to generate a reference signal and to provide the reference signal to the plurality of pixels, and control circuitry configured to control the reference signal generator and the plurality of pixels to perform one or more continuous-wave phase measurements for each pixel and to control the reference signal generator and the plurality of pixels to perform a coded-modulation measurement for each pixel. The control circuit is further configured to determine a mask value for each pixel, based on the respective coded-modulation measurement, and to apply the mask value for each pixel to a respective distance value calculated from the one or more continuous-wave phase measurements for the pixel, to obtain a masked distance value for each pixel.

The techniques and apparatus described herein may be used to efficiently obtain distance measurements, such as in a depth map, without ambiguity due to phase wrapping. These techniques may also be used to selectively filter image data to limit the data to images of objects falling within a predetermined range of distances from the image sensor.

Variants of the above techniques and apparatuses and further advantages are discussed in the detailed description that follows.

DETAILED DESCRIPTION

Figure 1:
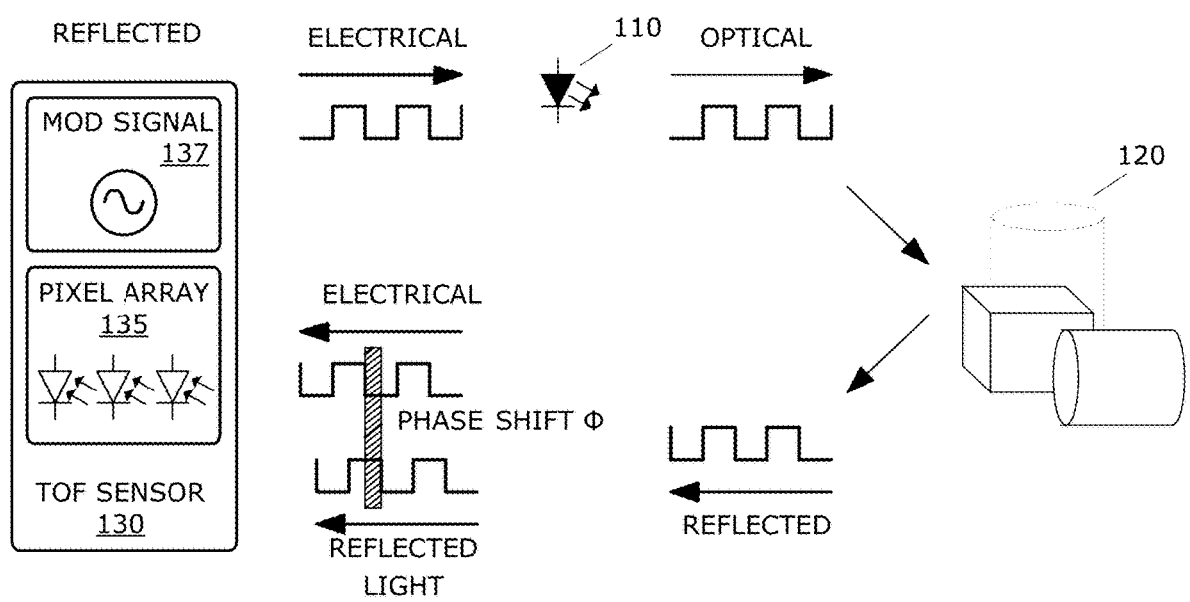
FIG. 1 is a diagram illustrating the principles of time-of-flight measurement according to some of the embodiments described herein.

The present invention will now be described with reference to the attached drawing figures, wherein like reference numerals are used to refer to like elements throughout, and wherein the illustrated structures and devices are not necessarily drawn to scale. In this disclosure, the terms "image" and "image sensor" are not limited to images or sensors involving visible light but encompass the use of visible light and other electromagnetic radiation. Thus, the term "light" as used herein is meant broadly and refers to visible light as well as infrared and ultraviolet radiation.

FIG. 1 illustrates the basic principles of continuous-wave (CW) time-of-flight (TOF) measurements, which are well known. A light source 110, such as a light-emitting diode (LED) or vertical-cavity surface-emitting laser (VCSEL), is modulated with an electrical signal (e.g., a radio-frequency sinusoid at, for example, 300 MHz), so that the light source 110 emits an amplitude-modulated optical signal towards the target scene 120. Traveling at the speed of light c, the light signal reflects from an object or objects in the scene 120 and arrives back at a pixel array 135 in the TOF sensor 130, with the time of flight to the target scene 120 and back imposing a phase shift of Ø on the optical signal as received at the pixel array 135, relative to the originally transmitted optical signal.

The modulation signal 137 used to modulate the emitted light, or a phase-shifted version of it, is also supplied as a reference signal to the pixels in pixel array 135, to be correlated with the modulation signal superimposed on the reflected optical signal—in effect, the reflected optical signal is demodulated by each pixel in the pixel array 135.

Figure 2:
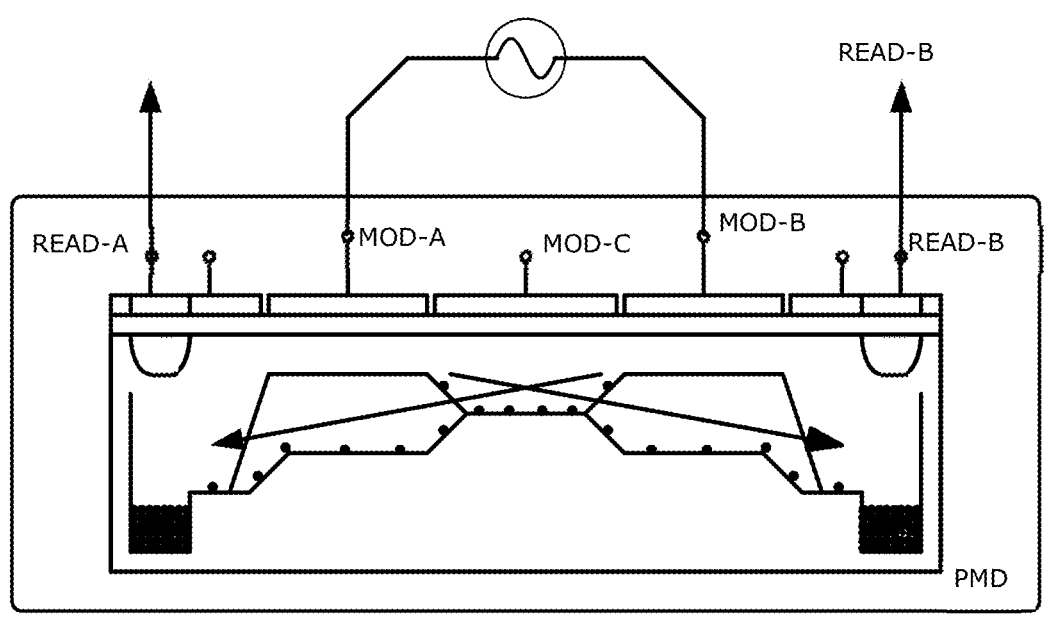
FIG. 2 illustrates an example photonic mixing device (PMD).

While the structure and design of light-sensing pixels may vary, each of the pixels in pixel array 135 may in some instances be a photon mixing device, or PMD. FIG. 2 illustrates the basic structure of an example PMD, which includes readout diodes A and B and modulation gates A and B. A reference signal is applied differentially across the modulation gates A and B, creating a gradient in electric potential across the p-substrate, while incoming light is received at a photo gate/diode. A differential sensor signal is generated across the readout diodes A and B. The sensor signal from a pixel may be integrated for a period of time to determine phase measurement information.

The difference between voltages at the Read-A and Read-B nodes of the PMD corresponds to the correlation between the modulated optical signal detected by the photosensitive diode structures in the illustrated device and the reference signal, which is applied between the Mod-A and Mod-B nodes of the device. Thus, the PMD (and other light-sensitive pixel structures) demodulate the modulated optical signal reflected from the target scene 120, producing a pixel signal value (in this case the difference between voltages at Read-A and Read-B) indicative of the distance traveled by the reflected optical signal, as discussed in further detail below.

While the modulation signal may take any of a variety of forms, the principle behind this correlation/demodulation is most easily seen with a sinusoidal signal as a modulation signal. If the modulation signal g(t) and the received signal s(t) with modulation amplitude 'a' and phase shift 'Ø' are given as:

$$m(t) = \cos(\omega t), \text{ and}$$

$$s(t) = 1 + (a \times \cos(\omega t + \emptyset))$$

then the correlation of the received signal with the reference signal gives:

$$r(\tau) = \left(\frac{a}{2}\right) \cos(\emptyset + w\tau),$$

which is a function of the phase difference Ø between the two signals. It will be appreciated that with a periodic modulation signal, this correlation can be carried out for an extended period of time, e.g., several cycles of the modulating signal, to improve the signal-to-noise ratio of the resulting measurement.

Figure 3:
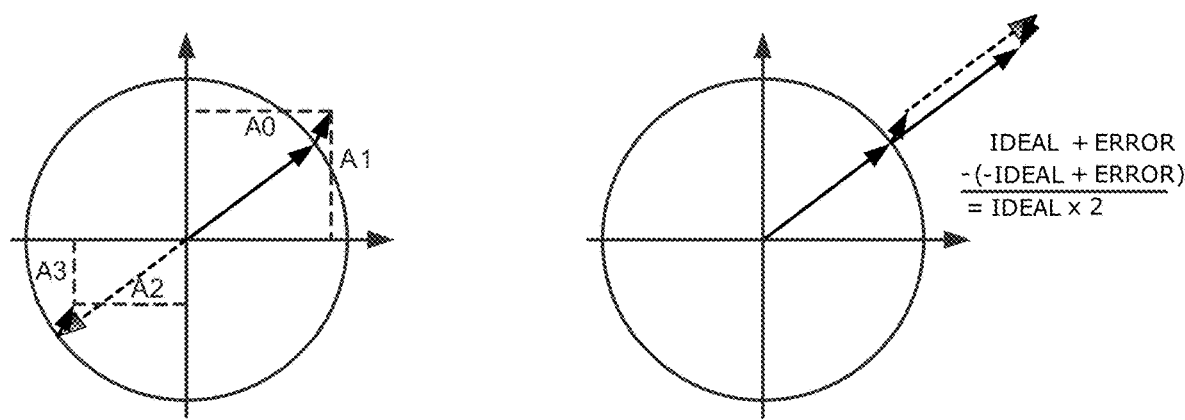
FIG. 3 is a diagram illustrating principles of phase measurement according to time-of-flight (TOF) techniques.

The phase difference between the emitted optical signal and the received reflection of that signal, which is proportional to the distance traveled by the optical signal, can be extracted by an N-phase shifting technique. This requires sampling the correlation function at N different points, e.g., by performing correlations using N different phase shifts of the reference signal, with respect to the modulating signal g(t). At least two measurements are required to calculate this phase shift, and hence to determine the distance traveled. This is often done using four different phase shifts, e.g., at 0, 90, 180, and 270 degrees, as this allows for a simple cancellation of systematic offsets in the correlation results. This is seen in FIG. 3, which shows how the correlations A0 and A1, at 0 and 90 degrees, respectively, correspond to a first phase vector having an "ideal" component corresponding to the actual difference traveled by the optical signal and a systematic component reflecting systematic error in the measurements and readout. Likewise, the correlations A2 and A3, at 180 and 270 degrees, respectively, correspond to a second phase vector pointing in the opposite direction, with an exactly opposite "ideal" component and an identical systematic component. In the figure, the ideal components are represented by the vectors extending from the origin to the circle, while the systematic error components are represented by the smaller vectors. The actual phase Ø can then be calculated as follows:

$$\emptyset = \arctan\left(\frac{A1-A3}{A2-A0}\right).$$

From this phase, the distance, or "depth" to the target scene 120 can be calculated as follows:

$$D = \frac{c \times \emptyset}{4\pi f_{mod}},$$

where $f_{mod}$ is the frequency of the modulating signal.

It will be immediately appreciated that, because of "phase wrapping," that this distance calculation has an ambiguous result, such that it is not possible to tell from a single distance calculation exactly which of several possible distances could have yielded the calculated phase.

The distance where this phase wrapping occurs is called the ambiguity distance, which is defined as $$d_{amb} = \frac{c}{2f_{mod}}.$$

This ambiguity distance is one-half the free-space wavelength of the modulating signal. Thus, for example, the ambiguity distance for an 80 MHz modulating signal is about 1.9 meters.

Figure 4:
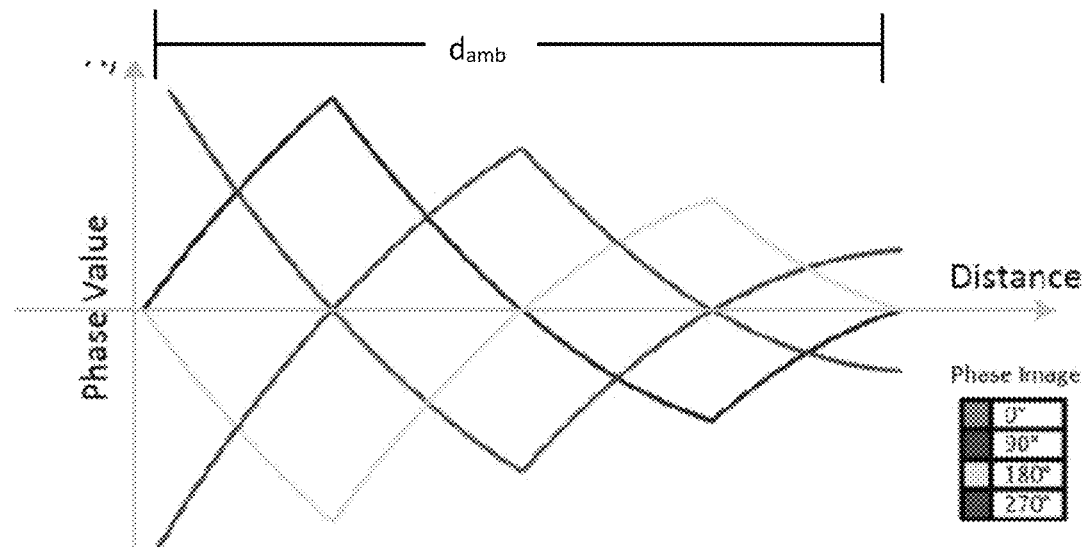
FIG. 4 illustrates a correlation function for time-of-flight phase measurements.

The significance of this phase wrapping can be seen in FIG. 4, which shows an example of phase measurement results for CW TOF phase measurements, as a function of distance. As can be appreciated from the figure, although the amplitude of the correlation attenuates as the distance increases, it is not possible, without additional information, to distinguish between a signal reflected from an object at a distance of x and a signal reflected from an object with somewhat higher reflectivity, at a distance of $x+d_{amb}$. Put differently, the ambiguity distance is the width of the region in which every correlation value is unique—extending beyond this region results in duplicated correlation values.

Various techniques for resolving this ambiguity are known. One approach is to incorporate amplitude information obtained from the reflected optical signal into the distance determination. Another approach is to repeat the measurement with a different modulating frequency, which results in a different ambiguity distance. The results of this second measurement can be combined with the first to resolve the ambiguity, as the measurements should provide coinciding results for only a single distance. However, this approach doubles the power consumption, compared to a single set of exposures, can create motion artifacts, due to the additional time needed to complete the measurements, and requires significantly more computation.

Figure 5:
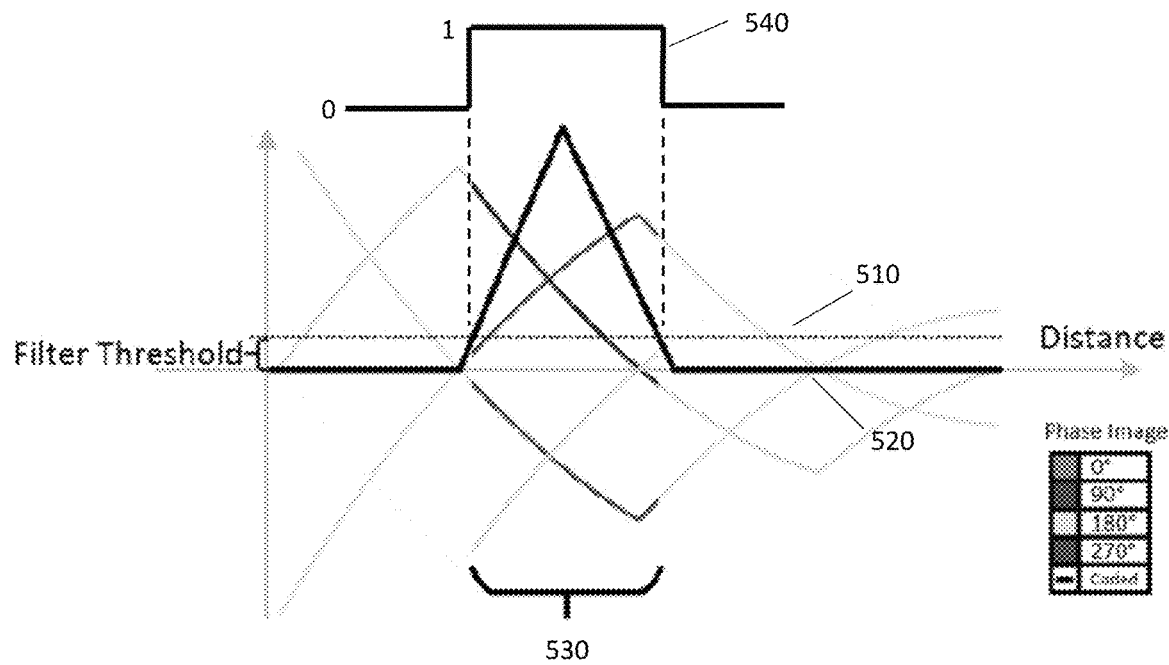
FIG. 5 illustrates a correlation function for an example coded-modulation measurement, along with a corresponding mask.

Sensing distances with coded modulation is another approach that can be used to avoid distance ambiguity problems. With modulation coding, the emitted light pulses and the pixel reference signal (which is used by the TOF pixels to measure a correlation with the received signal reflected from the object of interest) are adapted in such a way that the autocorrelation function is cut-off at certain distances. An example of this is depicted in FIG. 5. In this figure, the bolded line 530 represents the correlation measurement at a ToF pixel, as a function of distance, for an example coded-modulation measurement. As can be seen in the figure, the function has a single peak, and yields significant amplitudes over only a limited range of distances. Results of this kind can be achieved with modulation signals (and corresponding reference signals) that amplitude-modulate the optical signal with m-sequences, for example, although other code-modulation signals are known and have been discussed.

However, using only coded-modulation measurements to calculate distance images comes with some disadvantages. These measurements require significantly more energy per measurement and can result in poorer depth resolution than CW ToF measurements. If the same signal strength as in conventional continuous wave ToF is desired, the exposure time needs to be increased. This might not even be possible in some scenarios, however, due to eye-safety regulations.

According to the presently disclosed techniques, these problems with CW ToF measurements and coded-modulation ToF measurements are overcome by combining the two types of measurements. Thus, for example, a conventional continuous-wave ToF depth image is captured using 2, 3, 4, or any number of phase images. By capturing at least one additional image with coded modulation, a filter mask for the conventional depth image can be created. The filter mask can also be done with other number of coded modulation frames (2, 3, 4 . . . n), which can increase and adapt the filter range.

This filter mask is created by comparing each pixel value of the coded modulation image to a threshold. An example of such a threshold is shown in FIG. 5, where the threshold 510 is set at a level that is above the floor of the autocorrelation waveform 520. Measurement values above the threshold 510 yield a first predetermined mask value, such as "1," as shown by the mask 540 illustrated in the figure, indicating that the measurement at that pixel corresponds to received light signal from a distance within the measurement range indicated by the figure. Measurement values below the threshold 510 yield a second predetermined mask value, such as "0," indicating that the measurement at that pixel indicates no light signal reflected from a distance inside the measurement range 530.

The resulting mask values can be applied on a pixel-by-pixel basis to a depth map and/or a 3D point cloud computed from the CW ToF measurements, e.g., by multiplying the mask values by the corresponding distance values calculated from the CW measurements, thus masking out any responses from distances outside the measurement range 530. Alternatively, these mask values can be used, again on a pixel-to-pixel basis, to avoid even performing a distance calculation for those pixels corresponding to mask values of "0," such that a default value (e.g., "0") is inserted into the depth map for each of these pixels. With this approach, as shown in FIG. 5, phase measurements outside the measurement range 530 are effectively filtered out.

Figure 6:
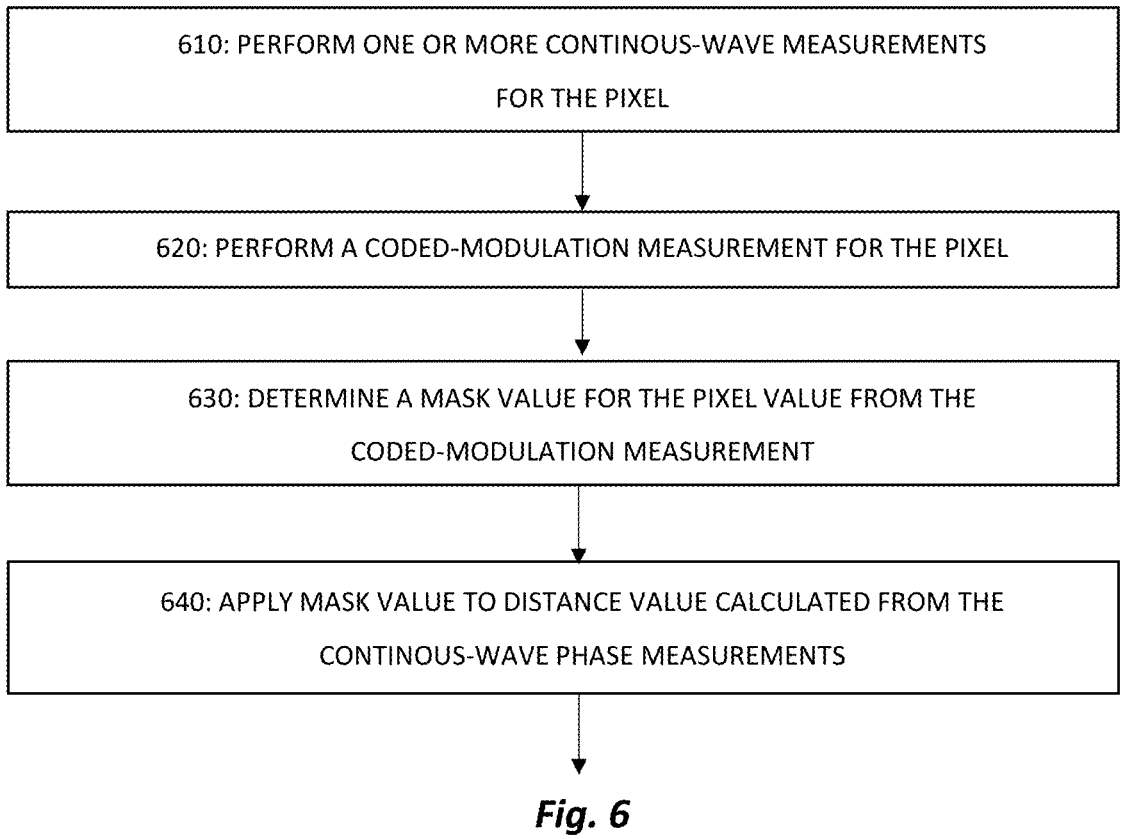
FIG. 6 is a process flow diagram illustrating an example method for performing depth measurements using an image sensor, according to some of the presently disclosed embodiments.

With the above explanations in mind, it will be appreciated that FIG. 6 illustrates an example method for performing depth measurements with an image sensor. The procedure is shown in the process flow diagram for only a single pixel, for simplicity. It will be appreciated, of course, that the illustrated process may be carried out simultaneously for many pixels, e.g., for all pixels in a two-dimensional array of pixels, so as to produce a depth map.

The method comprises, as shown at block 610, performing one or more continuous-wave phase measurements for the pixel. Each of these measurements may be performed with a varying phase difference between the reference signal used for the measurement and the modulating signal applied to light illuminating the object or objects of interest, in some embodiments. More particularly, the illustrated step of performing one or more continuous-wave phase measurements may comprise measuring a correlation between received light at the pixel and a reference signal, for each of the one or more continuous-wave phase measurements, using a reference signal with a different phase difference, relative to a continuous-wave modulation of emitted light illuminating an object of interest, for each of the one or more continuous-wave phase measurements. In some embodiments, for example four continuous-wave phase measurements are performed for the first pixel, the reference signals for the four continuous-wave phase measurements having phase differences (relative to the light-modulating waveform) differing from one another by 90 degrees.

As shown at block 620, the method further comprises performing a coded-modulation measurement for the pixel. Advantageously, this measurement is performed using a modulating waveform and corresponding reference signal that produce a cross-correlation waveform having high values only for a desired range of measurement distances. In some embodiments, then, performing this coded-modulation measurement may comprise measuring a correlation between received light at the pixel and a reference signal, using a reference signal having a cross-correlation function, relative to a waveform that modulates emitted light illuminating an object of interest, with a single peak over a range of distances substantially greater than an ambiguity distance for the one or more continuous-wave phase measurements. By substantially greater is meant a range of distances 2 or 3 times, or more, than the ambiguity distance for the continuous-wave phase measurements. The reference signal for this coded-modulation measurement may be an m-sequence, for example, with a corresponding modulation waveform being used to modulate the light illuminating the object or objects of interest during the measurement. Although the coded-modulation measurement for the pixel is illustrated in FIG. 6 after the continuous-wave measurements of block 610, this coded-modulation measurement may be performed before, after, or in between continuous-wave measurements, in various embodiments.

As shown at block 630, the method further comprises determining a mask value for the pixel, based at least in part on the coded-modulation measurement. This may be done, for example, by comparing the coded-modulation measurement to a threshold and setting the mask value to a first predetermined value, such as "1", in response to the coded-modulation measurement exceeding the threshold. The mask value may be set to a second predetermined value, such as "0," when the coded-modulation measurement is less than the threshold. In this example, only a single coded-modulation measurement for the pixel is used to obtain the mask value. In other embodiments, two or more coded-modulation measurements for the pixel or for the pixel and one or more neighboring pixels may be combined, to obtain the mask value. In still others, an amplitude image (derived from the CW ToF measurements) can be used to refine the filter mask to compensate for different object reflectivities, which allows for a sharper cut between distances. Thus, the mask value itself may be the result of aggregating multiple coded-modulation measurements and/or filtering or smoothing of the coded-modulation measurements, and may further be adjusted based on amplitude information.

As shown at block 640, the mask value is then applied to a distance value calculated from the one or more continuous-wave phase measurements, to obtain a masked distance value for the pixel. With appropriate selection of the code-modulation waveform (and corresponding reference signal), there is no ambiguity in the masked distance value, even when only a single frequency is used for the modulating waveform for the continuous-wave phase measurements. When the method shown in FIG. 6 is performed for multiple pixels, e.g., for all of the pixels in a two-dimensional array of pixels in an image sensor, the result is a depth map with unambiguous depth values.

Techniques like those described above can be applied to other image data. Thus, for example, a mask generated from one or more coded-modulation measurements performed for each of a plurality of pixels of an image sensor may be used to mask amplitude image data obtained from CW TOF measurements. Such a mask may also be used to mask conventional image data, so as to provide masking of background details. This can be used to implement a privacy mask for video telephone calls, for example.

Figure 7:
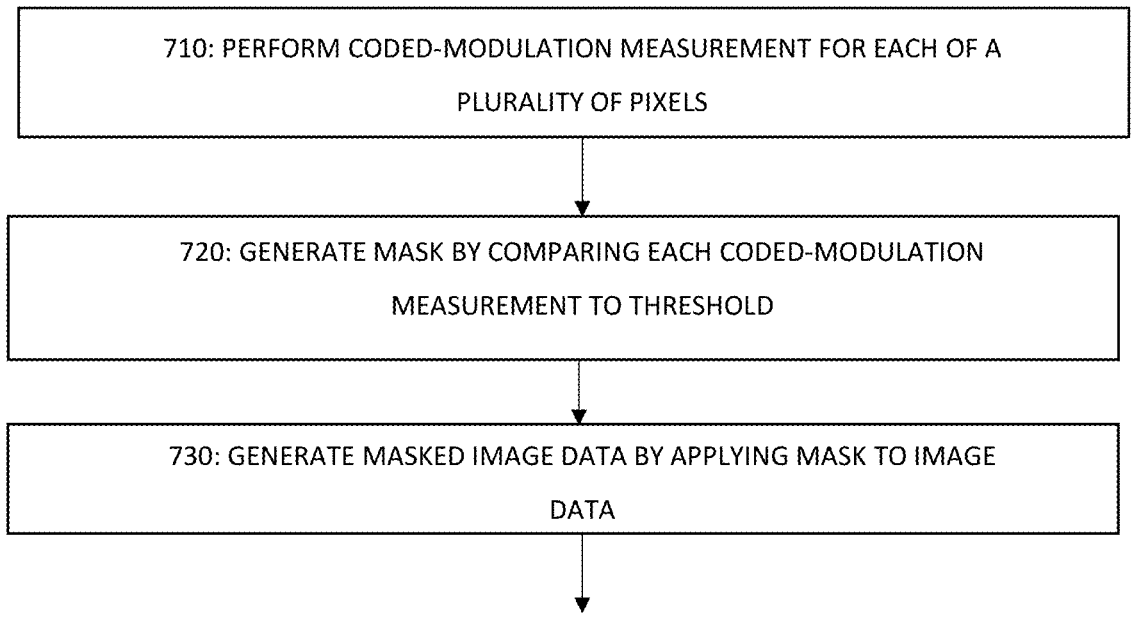
FIG. 7 is a process flow diagram illustrating an example method for processing image data, according to some of the presently disclosed embodiments.

FIG. 7 thus illustrates another example method for processing image data, according to some of the techniques disclosed herein. As shown at block 710, the illustrated method includes performing a coded-modulation measurement for each of a plurality of pixels of an image sensor. As discussed previously, these coded-modulation measurements may be performed using a light-modulating waveform and a corresponding reference signal selected to produce a correlation, at the pixels, above the threshold for only a predetermined range of distances from the image sensor to an imaged object or objects.

As shown at block 720, a mask is generated by comparing each coded-modulation measurement to a predetermined threshold value. Finally, as shown at block 730, masked image data is generated by applying the mask to image data obtained from the plurality of pixels or from another sensor.

In some embodiments, this image data is an amplitude image obtained from continuous-wave time-of-flight measurements performed with the pixels. In other embodiments or instances, this image data to which the mask is applied may be a depth map obtained from continuous-wave time-of-flight measurement data. In some embodiments, the generating of the masked image data may comprise generating a depth map by calculating distance values for pixels corresponding to unmasked pixels and refraining from performing distance calculations for pixels corresponding to masked pixels.

In view of the detailed examples provided above, it will be appreciated that the presently disclosed techniques may be applied to several image processing applications, to obtain one or more advantages. For example, for applications that require close range Time-of-Flight sensing, the techniques disclosed herein can be used to remove depth measurements that do not belong to the intended measurement range. These techniques may be employed, for instance, in front-facing smartphone cameras or gesture recognition systems.

Other applications include privacy imaging. The techniques employed are similar to those used to remove distance ambiguities, but where the resulting depth image/3D point cloud is used to remove information from a color camera stream, where the color camera is mounted next to the ToF sensor. Such an approach may be used, for example, in a video chat application for smartphones, where the ToF sensor is mounted front-facing next to the color camera. The background can then be removed, using a mask generated according to the presently disclosed techniques, to protect the privacy of the user by not showing details of his surroundings.

The techniques, of course, may also be used to eliminate erroneous measurements caused by the phase-wrapping discussed above. This is particularly useful for long to mid-range applications, such as 3D scanning. By using a coded modulation image as guidance, it is possible to determine to which period the sensed depth values belong. The position of the peak of the coded modulation image might be adapted to the scene in order to provide the best phase-unwrapping performance.

Other applications of the presently disclosed techniques are also possible.

Figure 8:
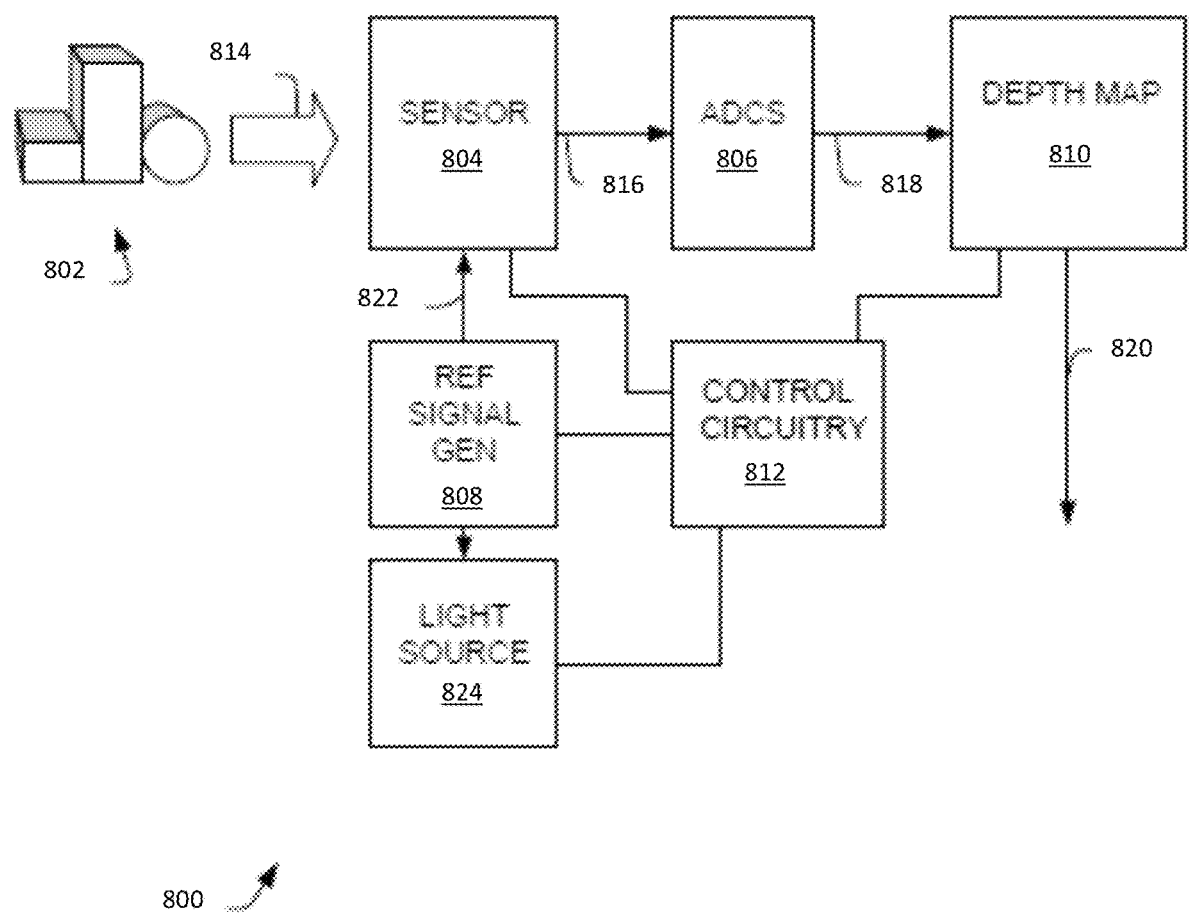
FIG. 8 is a block diagram illustrating components of an example image processing system, according to some embodiments.

FIG. 8, correspondingly, illustrates an example image processing system 800, according to several embodiments of the presently disclosed devices and systems. The system 800 can be utilized to detect objects, e.g., as shown in target scene 802, as well as to determine distances to the detected objects.

The illustrated system 800 includes a light source 824, which is configured to amplitude modulate a beam of light and emit the amplitude-modulated light towards the scene 802. The amplitude modulation may be based on a reference signal generated by reference signal generator 808. For continuous-wave time-of-flight measurements, the reference signal may be a radio-frequency (RF) signal, e.g., in the MHz range, although other modulation frequencies can be used. For coded-modulation measurements, the reference signal may be a code sequence, such as an m-sequence. The emitted light can include light having varied ranges of wavelength, such as sunlight and infra-red. The emitted light reflects from one or more objects in the scene and returns to the sensor 804.

The illustrated image processing system 800 in FIG. 8 further includes a sensor 804, which comprises a plurality of pixels configured to generate a respective plurality of pixel signal values in response to received light 814, where each pixel is configured to obtain its respective pixel signal value by demodulating received light using a reference signal 822. As seen in FIG. 8, received light 802 may be reflected from a target scene 802. As discussed above, while several suitable pixel configurations are possible, one suitable pixel design is the PMD described above.

The numbers of pixels, rows, and columns can vary, from one embodiment to another, and are selected based on factors including desired resolution, intensity, and the like. In one example, these sensor characteristics are selected based on the objects to be detected and the expected distances to the objects. Thus, for example, the pixel resolution of the pixels in sensor 804 may vary, from one embodiment to another. Small objects require a higher resolution for detection. For example, finger detection requires a resolution of <5 mm per pixel at a distance or range of about 0.5 meters. Medium sized objects, such as hand detection, require a resolution of <20 mm per pixel at a range of about 1.5 meters. Larger sized objects, such as a human body, require a resolution of <60 mm per pixel at about 2.5 meters. It is appreciated that the above examples are provided for illustrative purposes only and that variations can occur including other objects, resolutions and distances for detection. Some examples of suitable resolutions include VGA—640×400 pixels, CIF—352×288 pixels, QQ-VGA—160×120 pixels, and the like.

Image processing system 800 further includes a reference signal generator 808, which may be configured to generate a continuous-wave reference signal 822 with a selectable phase, relative to the phase of a modulation signal applied to light transmitted towards target scene 802, and to provide the reference signal 822 to the plurality of pixels in sensor 804. The reference signal generator 808 may be further configured to generate a code-modulation reference signal, which may take the form of an m-sequence, for example, and provide the reference signal 822 to the plurality of pixels in sensor 804 for code-modulation measurements. Image processing system 800 still further includes an analog-to-digital converter (ADC) circuit 806, which may include one or several ADCs, operatively coupled to the plurality of pixels in sensor 804.

The illustrated image processing system 800 further includes control circuitry 812, which may comprise, for example a processor, controller, or the like, and/or other digital logic. As seen in the figure, the control circuitry 812 may control the operation of the reference signal generator 808, the sensors 804, and the light source 824. The control circuitry 812 is further configured to control the generation and use of an output such as a depth map 810, a 3D point cloud, etc. In several embodiments, the control circuitry 812 is configured to cause the image processing system 800 to carry out one or more methods like those described above in connection with FIGS. 6 and 7.

Thus, for example, control circuitry 812 in some embodiments may be configured to control the reference signal generator 808 and the plurality of pixels in sensor 804 to perform one or more continuous-wave phase measurements for each pixel, and to control the reference signal generator 808 and the plurality of pixels in sensor 804 to perform a coded-modulation measurement for each pixel. The control circuitry 812 in these embodiments may be further configured to determine a mask value for each pixel, based on the respective coded-modulation measurement, and to apply the mask value for each pixel to a respective distance value calculated from the one or more continuous-wave phase measurements for the pixel, to obtain a masked distance value for each pixel. These masked distance values may be stored in depth map 810, for example.

In some embodiments, the control circuitry 812 may be configured to generate the mask value for each pixel by comparing the coded-modulation measurement for the pixel to a threshold and setting the mask value to a first predetermined value (such as "1") for each pixel where the coded-modulation measurement exceeds the threshold and setting the mask value to a second predetermined value (such as "0") for each pixel where the coded-modulation measurement is less than the threshold.

In some embodiments, the control circuitry 812 is configured to control the pixels to measure a correlation between received light at each pixel and the reference signal, for each of the one or more continuous-wave phase measurements, using a continuous-wave reference signal with a different phase difference, relative to a continuous-wave modulation of emitted light illuminating an object of interest, for each of the one or more continuous-wave phase measurements. In some of these embodiments, for example, the control circuitry 812 is configured to control the pixels to perform four continuous-wave phase measurements for each pixel, the reference signals for the four continuous-wave phase measurements having phase differences differing from one another by 90 degrees.

Likewise, in some embodiments, the control circuitry 812 is configured to control the pixels to perform the coded-modulation measurement for each pixel by measuring a correlation between received light at the pixel and a reference signal, using a reference signal having a cross-correlation function, relative to a waveform that modulates emitted light illuminating an object of interest, with a single peak over a range of distances substantially greater than an ambiguity distance for the one or more continuous-wave phase measurements. In some embodiments, this reference signal for the at least one coded-modulation measurement is an m-sequence. However, it will be appreciated that other codes may be used.

In some embodiments, the control circuitry 812 may be configured to control the reference signal generator 808 and the pixels in sensor 804 to perform a coded-modulation measurement for each of the plurality of pixels. In some embodiments, the coded-modulation measurements are performed using a light-modulating waveform and a corresponding reference signal selected to produce a correlation, at the pixels, above the threshold for only a predetermined range of distances from the image sensor to an imaged object or objects.

The control circuitry 812 may be further configured to generate a mask by comparing each coded-modulation measurement to a predetermined threshold value. The control circuitry 812 in these embodiments may be further configured to generate masked image data by applying the mask to image data obtained from the plurality of pixels.

In some of these embodiments, the image data obtained from the plurality of pixels is a depth map obtained from continuous-wave time-of-flight measurements performed with the pixels. In other embodiments or in other instances, the image data obtained from the plurality of pixels is an amplitude image obtained from continuous-wave time-of-flight measurements performed with the pixels. In still other embodiments and/or other instances, the image data obtained from the plurality of pixels may be three-dimensional (3D) point cloud data.

In some embodiments, the control circuitry 812 may be configured to generate the masked image data by generating a depth map, where generating the depth map in these embodiments comprises calculating distance values for pixels corresponding to unmasked pixels and refraining from performing distance calculations for pixels corresponding to masked pixels.

In view of the detailed discussion above, it will be appreciated that the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for performing depth measurements with an image sensor, the method comprising, for at least a first pixel:
    performing one or more continuous-wave phase measurements for the first pixel of the image sensor;
    performing a coded-modulation measurement for the first pixel;
    determining a mask value for the first pixel, based on the coded-modulation measurement; and
    applying the mask value to a distance value calculated from the one or more continuous-wave phase measurements, to obtain a masked distance value for the first pixel;
wherein performing the coded-modulation measurement for the pixel comprises:
    measuring a correlation between received light at the pixel and a reference signal, using a reference signal having a cross-correlation function, relative to a waveform that modulates emitted light illuminating an object of interest, with a single peak over a range of distances substantially greater than an ambiguity distance for the one or more continuous-wave phase measurements.

2. The method of claim 1, wherein determining the mask value comprises comparing the coded-modulation measurement to a threshold and setting the mask value to a predetermined value in response to the coded-modulation measurement exceeding the threshold.

3. The method of claim 1, wherein performing the one or more continuous-wave phase measurements for the first pixel comprises:
    measuring a correlation between received light at the pixel and a reference signal, for each of the one or more continuous-wave phase measurements, using a reference signal with a different phase difference, relative to a continuous-wave modulation of emitted light illuminating an object of interest, for each of the one or more continuous-wave phase measurements.

4. The method of claim 3, wherein the method comprises performing four continuous-wave phase measurements for the first pixel, the reference signals for the four continuous-wave phase measurements having phase differences differing from one another by 90 degrees.

5. The method of claim 1, wherein the reference signal for the at least one coded-modulation measurement is an m-sequence.

6. A method for processing image data, the method comprising:
    performing a coded-modulation measurement for each of a plurality of pixels of an image sensor;
    generating a mask by comparing each coded-modulation measurement to a predetermined threshold value; and
    generating masked image data by applying the mask to image data, wherein generating the masked image data comprises generating a depth map by calculating distance values for pixels corresponding to unmasked pixels and refraining from performing distance calculations for pixels corresponding to masked pixels.

7. The method of claim 6, wherein the image data is a depth map obtained from continuous-wave time-of-flight measurements performed with the pixels.

8. The method of claim 6, wherein the image data is an amplitude image obtained from continuous-wave time-of-flight measurements performed with the pixels.

9. The method of claim 6, wherein the image data is three-dimensional (3D) point cloud data.

10. A method for processing image data, the method comprising:
performing a coded-modulation measurement for each of a plurality of pixels of an image sensor;
generating a mask by comparing each coded-modulation measurement to a predetermined threshold value; and
generating masked image data by applying the mask to image data,
wherein the coded-modulation measurements are performed using a light-modulating waveform and a corresponding reference signal selected to produce a correlation, at the pixels, above the threshold for only a predetermined range of distances from the image sensor to an imaged object or objects.

11. An image processing system comprising:
a sensor comprising a plurality of pixels configured to generate a respective plurality of pixel signal values in response to received light, wherein each pixel is configured to obtain its respective pixel signal value by demodulating received light using a reference signal;
a reference signal generator configured to generate a reference signal and to provide the reference signal to the plurality of pixels, and
control circuitry configured to:
control the reference signal generator and the plurality of pixels to perform one or more continuous-wave phase measurements for each pixel;
control the reference signal generator and the plurality of pixels to perform a coded-modulation measurement for each pixel;
determine a mask value for each pixel, based on the respective coded-modulation measurement; and
apply the mask value for each pixel to a respective distance value calculated from the one or more continuous-wave phase measurements for the pixel, to obtain a masked distance value for each pixel;
wherein the control circuitry is configured to generate the mask value for each pixel by comparing the coded-modulation measurement for the pixel to a threshold and setting the mask value to a first predetermined value for each pixel where the coded-modulation measurement exceeds the threshold and setting the mask value to a second predetermined value for each pixel where the coded-modulation measurement is less than the threshold.

12. The image processing system of claim 11, wherein the control circuitry is configured to control the pixels to measure a correlation between received light at each pixel and the reference signal, for each of the one or more continuous-wave phase measurements, using a continuous-wave reference signal with a different phase difference, relative to a continuous-wave modulation of emitted light illuminating an object of interest, for each of the one or more continuous-wave phase measurements.

13. The image processing system of claim 12, the control circuitry is configured to control the pixels to perform four continuous-wave phase measurements for each pixel, the reference signals for the four continuous-wave phase measurements having phase differences differing from one another by 90 degrees.

14. The image processing system of claim 12, wherein the control circuitry is configured to control the pixels to perform the coded-modulation measurement for each pixel by:
measuring a correlation between received light at the pixel and a reference signal, using a reference signal having a cross-correlation function, relative to a waveform that modulates emitted light illuminating an object of interest, with a single peak over a range of distances substantially greater than an ambiguity distance for the one or more continuous-wave phase measurements.

15. The image processing system of claim 14, wherein the reference signal for the at least one coded-modulation measurement is an m-sequence.

16. An image processing system comprising:
a sensor comprising a plurality of pixels configured to generate a respective plurality of pixel signal values in response to received light, wherein each pixel is configured to obtain its respective pixel signal value by demodulating received light using a reference signal;
a reference signal generator configured to generate a reference signal and to provide the reference signal to the plurality of pixels, and
control circuitry configured to:
control the reference signal generator and the pixels to perform a coded-modulation measurement for each of the plurality of pixels;
generate a mask by comparing each coded-modulation measurement to a predetermined threshold value; and
generate masked image data by applying the mask to image data,
wherein the control circuitry is configured to generate the masked image data by generating a depth map, wherein generating the depth map comprises calculating distance values for pixels corresponding to unmasked pixels and refraining from performing distance calculations for pixels corresponding to masked pixels.

17. The image processing system of claim 16, wherein the image data is a depth map obtained from continuous-wave time-of-flight measurements performed with the pixels.

18. The image processing system of claim 16, wherein the image data is an amplitude image obtained from continuous-wave time-of-flight measurements performed with the pixels.

19. The image processing system of claim 16, wherein the image data is three-dimensional (3D) point cloud data.

20. An image processing system comprising:
a sensor comprising a plurality of pixels configured to generate a respective plurality of pixel signal values in response to received light, wherein each pixel is configured to obtain its respective pixel signal value by demodulating received light using a reference signal;
a reference signal generator configured to generate a reference signal and to provide the reference signal to the plurality of pixels, and
control circuitry configured to:
control the reference signal generator and the pixels to perform a coded-modulation measurement for each of the plurality of pixels;
generate a mask by comparing each coded-modulation measurement to a predetermined threshold value; and
generate masked image data by applying the mask to image data;
wherein the coded-modulation measurements are performed using a light-modulating waveform and a corresponding reference signal selected to produce a correlation, at the pixels, above the threshold for only a predetermined range of distances from the image sensor to an imaged object or objects.

* * * * *